United States Patent [19]

Ratskó et al.

[11] Patent Number: 4,763,916

[45] Date of Patent: Aug. 16, 1988

[54] HYDRAULIC JACKKNIFING-AFFECTING APPARATUS FOR ARTICULATED VEHICLES

[75] Inventors: István Ratskó; Attila Madocsay; József Ivony; Béla Horváth; Jeno Madi, all of Budapest, Hungary

[73] Assignee: Autoipari Kutato es Fejleszto Vallalat, Budapest, Hungary

[21] Appl. No.: 65,953

[22] Filed: Jun. 24, 1987

Related U.S. Application Data

[63] Continuation of Ser. No. 703,825, Feb. 21, 1985, abandoned.

[30] Foreign Application Priority Data

Feb. 24, 1985 [HU] Hungary ................ 739/84

[51] Int. Cl.$^4$ .............................................. B62D 53/06
[52] U.S. Cl. ................................. 280/432; 280/446 B
[58] Field of Search ................. 280/432, 446 B, 474

[56] References Cited

U.S. PATENT DOCUMENTS

| | | | |
|---|---|---|---|
| 4,106,792 | 8/1978 | Schultz et al. | 280/432 |
| 4,344,640 | 8/1982 | Ratsko et al. | 280/432 |
| 4,366,966 | 1/1983 | Ratsko et al. | 280/432 |
| 4,402,522 | 9/1983 | Ratskó et al. | 280/432 |
| 4,405,145 | 11/1983 | Bergman et al. | 280/432 |
| 4,412,592 | 11/1983 | Bergman et al. | 280/432 X |
| 4,455,035 | 6/1984 | Ivony et al. | 280/432 |
| 4,494,765 | 1/1985 | Ratsko et al. | 280/432 |
| 4,556,231 | 12/1985 | Schultz | 280/432 |
| 4,583,756 | 4/1986 | Hornung et al. | 280/446 B X |
| 4,620,717 | 11/1986 | Ivony et al. | 280/432 |

FOREIGN PATENT DOCUMENTS

| | | |
|---|---|---|
| 0046484 | 3/1982 | European Pat. Off. . |
| 2420303 | 11/1975 | Fed. Rep. of Germany . |
| 3031601 | 3/1981 | Fed. Rep. of Germany . |
| 3004409 | 8/1981 | Fed. Rep. of Germany . |
| 177521 | 1/1983 | Hungary . |
| 1032997 | 7/1983 | Hungary . |
| 179667 | 2/1984 | Hungary . |

Primary Examiner—John J. Love
Assistant Examiner—Mitchell J. Hill
Attorney, Agent, or Firm—Schweitzer & Cornman

[57] ABSTRACT

The disclosure relates to a jackknifing controlling system, for reducing undesirable jackknifing in an articulated vehicle, particularly with a rear drive. Sensing means is provided for measuring the angle of steering as well as the angle of articulation. At all times, the actual angle of articulation is compared to an ideal angle of articulation for the particular angle of steering, the ideal angle having been preprogrammed into a memory device. Whenever the actual angle of articulation deviates from the preprogrammed ideal angle by a predetermined amount, control actions are initiated to control the articulation. Further articulation in the direction of deviation is immediately blocked. Articulation in the opposite direction, toward the ideal, is freely allowed if the deviation exceeds a predetermined amount. If it is less than the predetermined amount, articulation, even toward the ideal angle is, damped by throttling of hydraulic flows. The range of deviation over which return articulation is damped follows a set of curves, embracing the curve of ideal articulation in an asymmetrical manner providing for optimum control over undesirable swinging.

5 Claims, 9 Drawing Sheets

HYDRAULIC JACKKNIFING-AFFECTING APPARATUS FOR ARTICULATED VEHICLES

This application is a continuation of our earlier application Ser. No. 703,825, filed Feb. 21, 1985, now abandoned.

BACKGROUND OF THE INVENTION AND DESCRIPTION OF THE PRIOR ART

The invention relates to a hydraulic jackknifing-controlling apparatus provided with hydraulic damping for articulated vehicles, in particular to rear-engined push-type articulated bussed.

It is a well known fact that with a rear-engined push-type articulated bus an apparatus for controlling jackknifing is desired in order to prevent irregular motion of the trailer. As a consequence of push forces arising from the driven wheels of the trailer, the rear-engined push-type articulated bus tends to jackknife toward the inside of a curve, as well as to be carried toward the outside of the curve if it is travelling at high speed. These phenomena can be controlled by means of jackknifing controlling apparatus, which tends to block improper articulation while permitting normal articulation.

The aim of application of any jackknifing controlling apparatus is to prevent dangerous motion of the vehicle without affecting normal motion. With the articulated bus of German DE-AS No. 2,420,303 (corresponding to the Hungarian Pat. HU-PS No. 177,521) the articulated blocking device will be actuated if the angle of the steered wheel and the angle of articulation are of opposite direction and if the angle of articulation is larger, than 5.5°.

Furtheron, to prevent jackknifing, the articulation will be blocked, if the angle of articulation is larger, than 5.5° and simultaneously it is larger than indicated by the angle of the steered wheels. The apparatus functions to damp lateral swinging of the trailer if the angle of the steered wheel is within the range of ±8° and the angle of articulation remains within the range of ±5.5°.

In accordance with patent application EU-0046,484, a built-in shock-absorber is unidirectionally operative. If compressed, its resistance is proportional to the speed of the piston, while the piston is relatively free to move in an extending direction. No externally controlled regulator is built in into the shock-absorber.

Experimental and plant experiences having been gained with rear-engined push-type articulated busses show that with higher travelling speeds, over 80-100 km/h, the trailer begins to swing as a consequence of a sudden movement of the steering or due to a sudden change in push force, or while changing the lane of traffic.

Proposals according to earlier patent specifications try to solve the problem in different ways. In systems with an hydraulic blocking piston, it seems to be obvious to build-in a flow reistance for damping, i.e. to apply a changeable resistance. In accordance with the Hungarian Pat. No. HU-PS 179,667 (U.S. Pat. No. 4,366,966; SU-PS No. 1,032,997) the extent of flow resistance increases with the magnitude of the articulation angle. However, with the solution according to the DE-OS No. 3,004,409, resistance is not a function of the change of the angle of articulation. For the control of flow resistance—which can be connected and disconnected—the latter specification proposes consideration of travel-dynamic characteristics differing from each other. According to one of the proposed solutions flow resistance can be adjusted to a low value at small angles of steering. According to another proposed solution damping resistance can be adjusted to a high value with low angles of steering, if the speed of travel is high. So the specification does not give a definite guidance in respect to the adjustment of the extent of damping for rear-engined push-type articulated busses with hydraulic jackknifing-blocking systems.

Resulting from the complicated travel dynamic characteristics of an articulated vehicle, it beooems apparent that lateral irregular swinging of the trailer cannot be correctly prevented while ignoring any of the fundamentally important travel-dynamic characteristic, as e.g. angle of the steered wheel (HU-PS No. 179,667) or angle of articulation (DE-OS No. 3,004,409), or where the extent of damping is correlated exclusively with the rate of change of the angle of articulation.

The aim of our invention is into develop a jackknifing-damping apparatus, which is able to prevent lateral swinging of the trailer by its damping effect and which promotes in a most efficient manner decay of the swinging process within the shortest time. The system of the invention takes into consideration the angle of articulation and its difference with respect to direction and magnitude compared to a predetermined optimum angle of articulation for a particular angle of the steered wheels. The new system actuates accordingly a changeable hydraulic resistance, which exerts a resisting moment proportional to angular speed of jackknifing. Shock absorbtion requires substantial flow resistance. At the same time, jackknifing motion taking place with the slip-free rolling of the vehicle wheels requires minimum throttling. The solution according to the invention for meeting these contradictory requirements is based on the recognition that an optimal angular speed of jackknifing motion is proportional to the difference between the actual angle of articulation and the ideal angle of articulation for the momentary angle of the steered wheels. Angular speed of optimal jackknifing motion is also directly proportional to the speed of advance of the articulated vehicle. As we do not desire to prevent optimal jackknifing motions, the extent of flow resistance should be inversely proportional to the difference between the actual angle of articulation and the ideal angle of articulation according to the momentary angle of the steered wheels. In addition, it is expedient to influence the magnitude of resistance inversely proportionally to the travelling speed of the articulated vehicle.

In accorance with the invention, the objective is achieved by utilizing with the jackknifing-affecting apparatus according to the Hungarian Patent HU-PS No. 182,445 (U.S. Pat. No. 4,344,640, DE-AS No. 3,031,601), an electronic apparatus for sensing and evaluating the angular position, which determines the difference between the actual angle of articulation and the ideal angle of articulation indicated by the angle of the steered wheels and providing a corresponding output signal. Such output signal is processed in an electronic throttle control unit and, as a function of the magnitude of deviation, it actuates a changeable and/or connected-disconnectable resistance arranged in a common hydraulic circuit with blocking cylinders. In one embodiment, flow resistance is controlled so that the curve of the angle of articulation ideally related to the angle of the steered wheels is enclosed by a controlling zone, within which a resistance-increasing unit becomes actuated. For angles of articulation lying outside this zone, the resistance device is set to a minimal flow resistance with the aim, that the trailer can approximate a regular jackknifing positon relatively small resistance. Prior to reaching this state, i.e., within the aforementioned zone of control, the device increases the flow resistance effect and this is exerts resistance against the movement of the trailer.

The system of our invention includes a unit for assessing the negative or positive deviation of the actual angle of articulation from the ideal angle of articulation indicated by the angle of the steered wheels. The positive or negative differential signal forms the input signal for the blocking/damping control unit of the equipment. There is also an hydraulic loop sensing the direction of flow in the hydraulic system. In addition, there is an electronic unit the output signal of which represents the extent of deviation of the actual angle of articulation from the ideal angle of articulation indicated by the angle of the steered wheel. This signal forms an input signal to a control for the damping unit. The damping unit has a changeable flow resistance in the hydraulic loop. It is provided with a flow resistor which is changing continuously and/or gradually in an extent which is inversely proportional to the deviation of the actual angle of articulation from the ideal angle of articulation.

In a preferred embodiment of the invention the control zone, enclosing the curve of the ideal angle of articulation in relation to the angle of the steered wheel, has a changing width and it occupies an asymmetric position in relation to the curve of the ideal angle of articulation.

To achieve safe and simple sensing and evaluation, the sensor for sensing the angle of the steered wheel and the sensor of the angle of articulation are formed with discs according to the Gray code and reading means related thereto.

DETAILED DESCRIPTION OF PREFERRED EMBODIMENTS OF THE INVENTION

Figure 1:
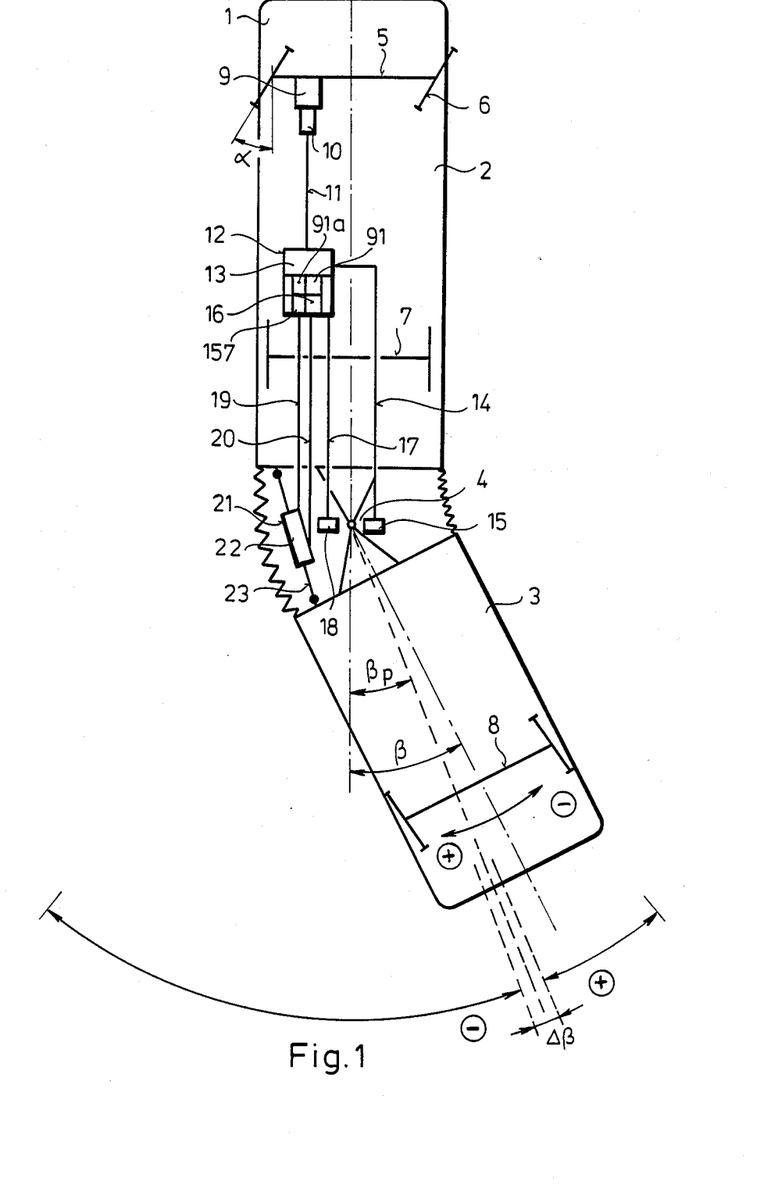
FIG. 1 is a schematic illustration of a push-driving articulated bus incorporating an anti-jackknife system according to the invention.

Front carriage 2 and trailer 3 of an articulated bus 1 are coupled by an articulation 4. The angle of articulation is indicated with, beta. Front wheels 6, positioned on axle 5 of the front carriage 2 are steerable with steering gate 9. Further axles 7 and 8 are not steered. Unit 10, sensing the angle of steering, is connected to the steering gear 9 and via the signal forwarding lead 11 to an angular position-evaluating electronic unit 13 of a main control unit 12. Similarly, unit 15, sensing the angle of articulation, is connected by the signal forwarding lead 14. The other part of the control unit 12 is formed by a blocking/control unit 16 of the jackknife-blocking system 13. A third sensor of the control unit 12 is formed by an element 18 sensing the change in the direction of the angle of articulation, which is connected via the signal forwarding lead 17 to the control unit 16 of the jackknife-blocking device. Similarly, connected thereto via the leads 19 and 20, is an hydraulic actuator 21 with two working spaces. The cylinder 22 thereof is connected to the carriage 2, while the piston 23 is connected to the trailer 3.

FIG. 1 shows the top view of the articulated bus 1. In this position, the direction of jackknifing can be considered as "positive", if the trailer 3 rotates clockwise around the articulation, while it is considered as "negative" if the direction is counter-closkwise. The cylinder 22 and the piston 23 of the hydraulic actuator 21 perform a relative motion in the direction of compression, in course of jackknifing in a "positive" direction, while in the "negative" the actuator extends.

In the position illustrated in FIG. 1, the ideal angle of articulation, beta p, is related to the angle of the steered wheel, alpha, as if the articulated bus 1 is travelling on a circular path with slip-free rolling of the wheels. The actual angle of articulation, beta, is slightly larger, than the ideal angle of articulation, beta p. To this angular position a "positive" output signal of the angular position evaluating unit 13 is developed. If in a clockwise direction the actual angle of articulation, beta, is less than the angle of articulation, beta p,—differing from the situation illustrated—, a "negative" output signal of the angular position evaluating unit 13 is developed. Angular positions of the carriage 2 and trailer 3 of the articulated bus are considered as coordinated within a predetermined angular range beta.

Figure 2:
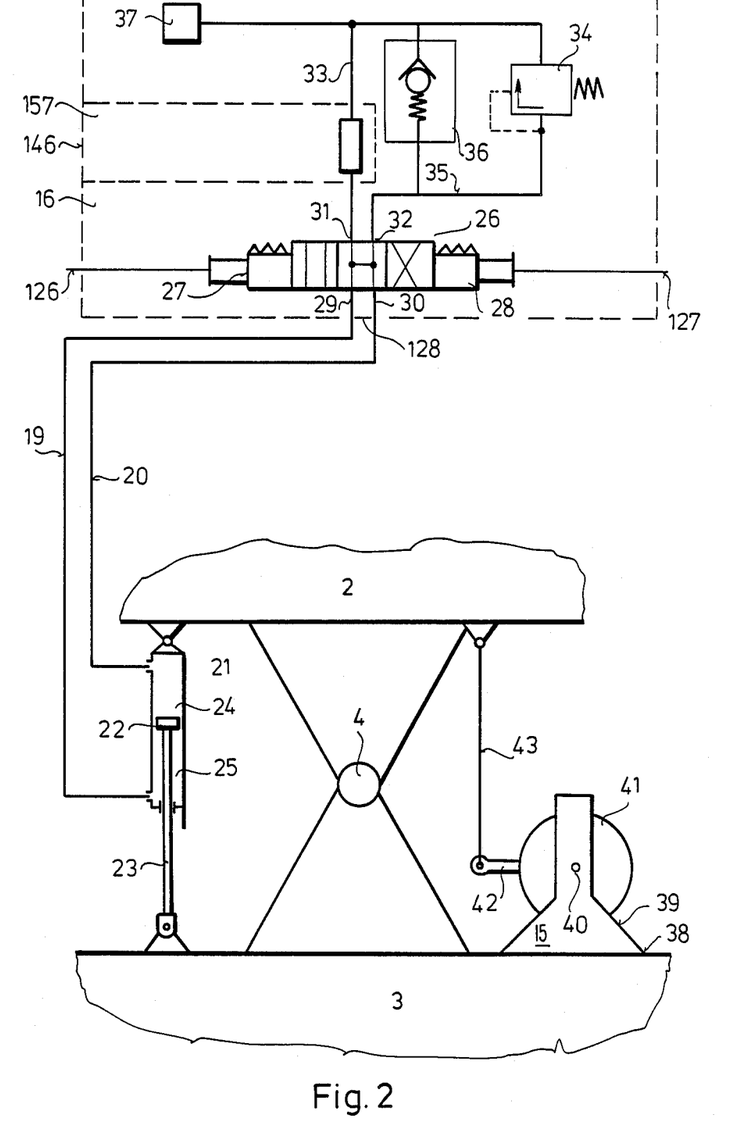
FIG. 2 is a schematic illustration of a simplified form of anti-jackknife system according to the invention.

FIG. 2 illustrates the hydraulic actuator 21 together with the blocking/damping control 16. The first actuator working space 25 is connected via the fluid line 19, and port 29 to a three-position four-way selector valve 26. The second working space 24, is connected via the line 20 and 30 to the selector valve. Third and fourth ports 32 and 31 are interconnected by an hydraulic loop 33, in which a check valve 36 is connected by a line 35, blocking the stream flowing from the third port 32 toward the fourth port 31. Connected in parallel to the check valve is a pressure regulating valve 34. An hydraulic supply tank 37 is connected to the hydraulic loop 33.

The slide member of the selector valve 26 is provided with electromagnets 27, 28, which in turn are connected with the angular position evaluating unit 13. In the middle position of the selector valve 26, the first and second ports 29, 30 are in communication. In the "negative" control position, the electromagnet 28 receives power through the second input 127 and shifts the slide valve toward the magnet. The first and fourth ports 29, 31 are thereby joined as are the second ports and the third ports 30, 32. In the "positive" control position, the electromagnet 27 receives power through the first input 126, shifting the slide valve to the left. The first port 29 is thereby joined with the third port 32, while the second and the fourth ports 30, 31 are also placed in communication. With the embodiment shown, the hydraulic actuator 21 and the blocking/damping control 16 form the sensor 18 determining the direction of jackknifing.

Figure 3:
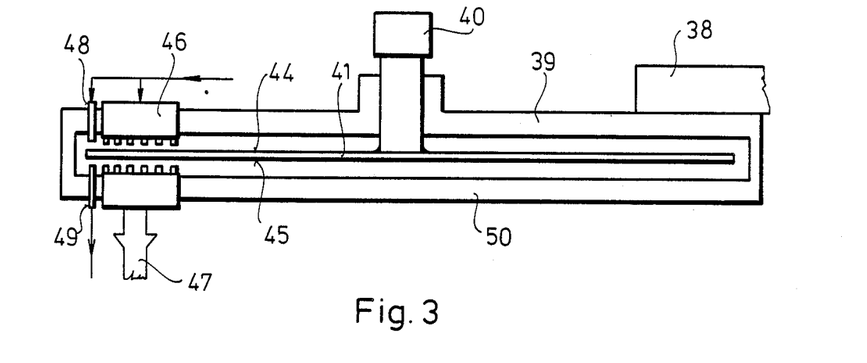
FIG. 3 is an enlarged cross sectional view of a sensing device utilized to advantage for senging angle of articulation.

FIG. 2 shows the arrangement of the built-in sensor 15 sensing the angle of articulation. A frame 39, forming the stationary element of the sensor is fixed on the bracket 38 of the trailer 2. A code disc 41, supported in a bearing on an axis 40, represents the moving element, which is coupled to the first carriage 2 by an arm 42 and push-rod 43. The sensor 15 is shown in FIG. 3. The moving and stationary elements of the steering sensor 10 are identical to the sensor 15 and will not be separately described.

In the frame 39 light ources 46 are directed toward the top surface 44 of the code disc 41, while light-sensing elements 47 are directed toward the bottom surface 45. These read code signals relating to the angular position. A light source 48 and sensor 49 are directed toward the code disc 41 and reads the control code field. The sensor unit 15 is encased in the closed housing 50.

Figure 4A:
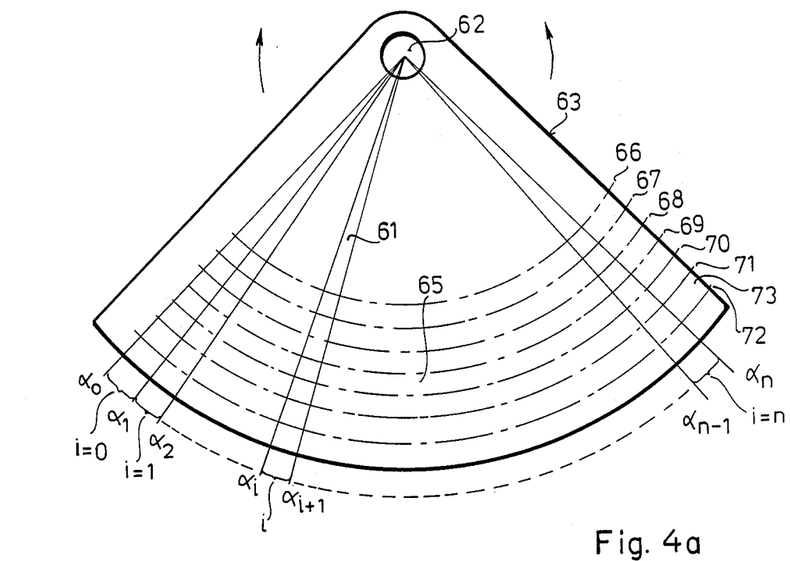
FIGS. 4a and 4b are illustrations of angle sensors utilized in the device of FIG. 3.
Figure 4B:
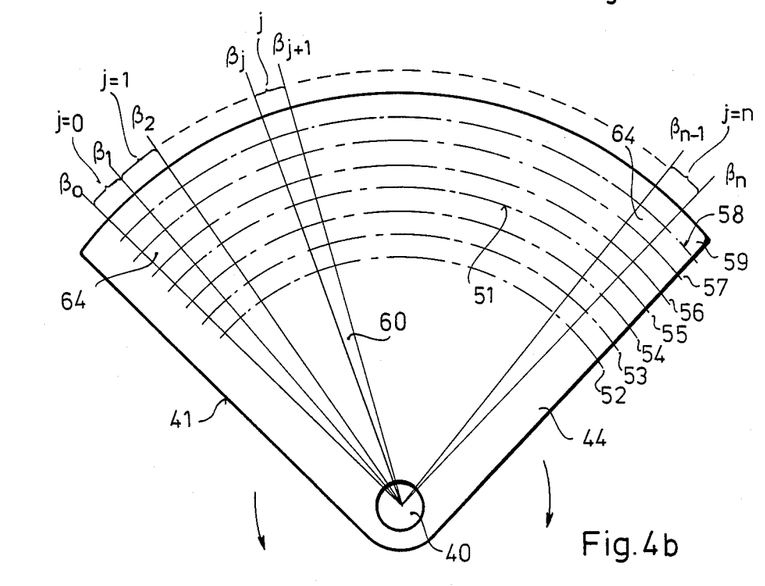

FIG. 4b shows the top view of the code disc 41 for sensing angle of articulation and FIG. 4a shows a code disc 63, rotating on a pivot 62, of the sensor 10, for sensing the angle of steering. In the code field 51 of the code disc 41, on six circular arcs, are rows of openings 52 to 57, formed in a hazard-free Gray code. Combinations of the row openings 52 to 57 (see FIG. 5) subdivide the whole range of the angles of bus articulation into sixty-four angular sections 60. Similar openings are formed in the code field 65 of the disc 63, on six circular arcs 66 to 71. Combinations of the openings of rows 66 to 71 likewise subdivide the range of the angle of the steered wheel into sixty-four angular sections 61. Accordingly, supposing the travel of the articulated bus 1 on a circle with a constant radius and slip-free rolling of the wheels, the angular section 60 FIG. 4b) is related in a known manner to the angular section 61 (FIG. 4a).

Figure 5:
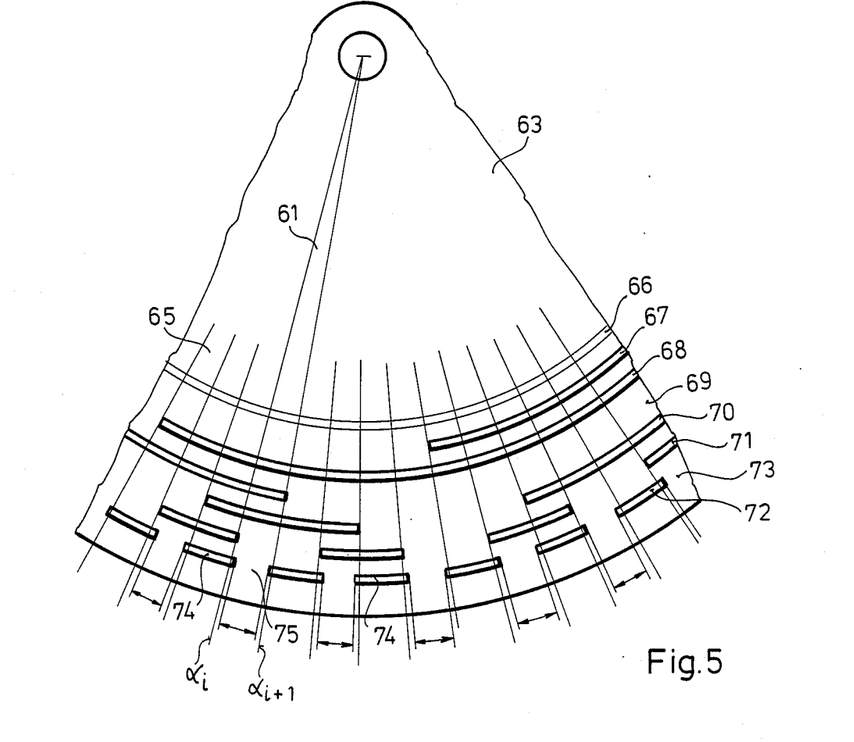
FIG. 5 is an enlargement of the sensing elements of FIGS. 4a, 4b, illustrating the Gray code sensing elements therein.

FIG. 5 illustrates the code disc 63, and, the formation of code field 65. In the rows 66 to 71, openings are formed, the length of arc of which is determined by the Gray code. In the row 72 of the control code field 73, in every odd-numbered angular section 61 a single signalling section 75 is formed. There is always an odd-numbered illuminated row of openings (66–71) in any code field 65.

Figure 6:
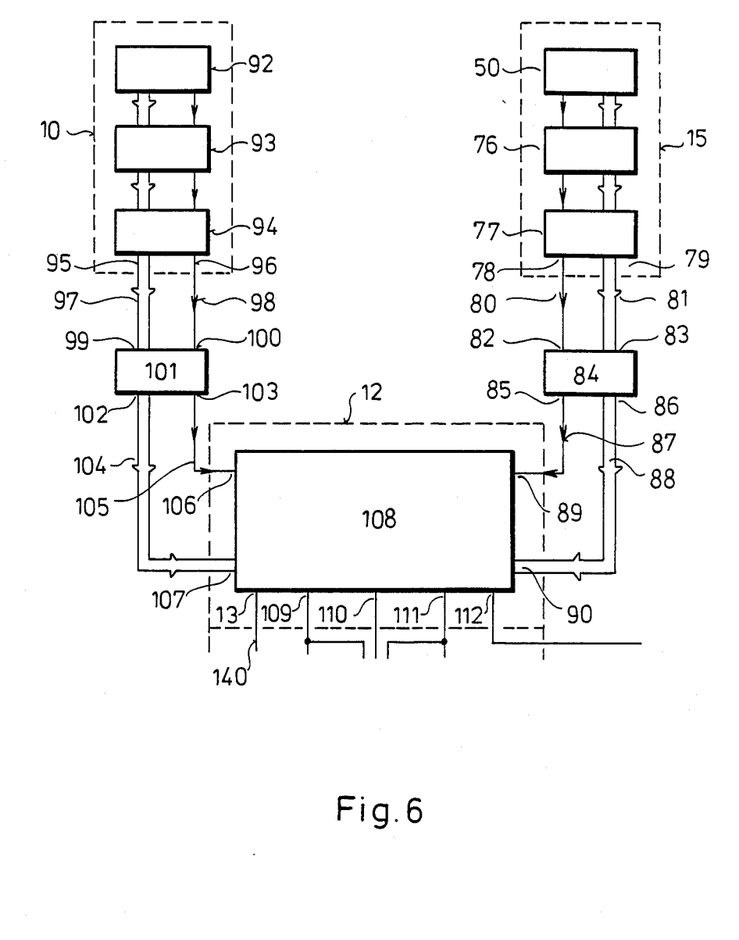
FIG. 6 is a schematic illustration of a portion of the electronic system utilized in the apparatus of the invention.

The unit 10 sensing the angle of steering is encased in a housing and is constructed so that it includes a matching circuit 93 and line-driving unit 94, the first output 95 of which represents the information output signal, while the second output 96 is the control signal output. The first output 95 is connected via line 97 to the first input 99 of the line-receiving unit 101, whereas the second output 96 is connected via line 98 to the second input 100 of the line-receiving unit 101. The line-receiving unit 101 processes the signals in the Gray code received on its first input 99 and releases them on its first ouput 102. Similarly the control code signals are released on the second output 103. The first output 102 is connected via line 104 to the first input 107 of the control unit 12, while the second output 103 is connected via line 105 to the fifth input 106 of the control unit 12.

The unit 15, sensing the angle of articulation, is constructed so that it includes a matching circuit 76 and line-driving unit 77, the first output 79 of which represents an information signal output, while the second output 78 is a control signal ouptut. The first output 79 is connected via line 81 to the first input 83 of the line-receiving unit 84, while the second output 78 is connected via line 80 to the second input of the line-receiving unit 84. The line-receiving unit 84 processes the signals in the Gray code received on its first input 83 and releases them on its first output 86. Similarly, the control code signals are released on the second output 85. The first output is connected via line 86 to the second input 90 of the control unit 12. The second output 85 is connected via line 87 to the fourth input 89 of the control unit 12. The unit 15 is encased inthe closed housing 50 which is provided with the first and second output connections 79, 78.

The third input 128 of the control unit 12 is an input receiving a signal which indicates the direction of jackknifing. This includes a pipe connections 19, 20 to the hydraulic actuator 22.

The control unit 12 has an electronic memory 108 with a fixed program, the four data inputs to which are the second 90, first 107, fourth 89 and fifth inputs 106, respectively. The memory 108, with its fixed program, forms the angular position evaluating unit. A first output 109 carries a signal related to a deviation with negative sign, the second output 110, carries a signal indicating coordination of steering and articulation, if such exists. A third output 111 carries a signal related to deviation with a positive sign.

In the programmed memory 108 the first input 107, the second input 90, the fourth input 89 and the fifth input 106 have altogether fourteen address lines are suitable for receiving bit information. To all possible signal combinations a combination of output signals, having been defined by programming, is ordered in form of bit information on the ouptuts 109–112. If on the first input 107 and second input 90, consisting of six address lines each, the signal information with the Gray code is identical, an output signal on the second output 110 reflects that condition. If, however, the code indicated by the signal on the first input 107 is smaller, than the code number indicated by the signal on the second input 90, an output signal, considered as positive, is carried by the third output 111.

If the code number represented by the signal of the first input 107 is higher than the code number represented by the signal on the second input 90, an output signal, considered as negative, is carried by the first output 109.

As will be understood, only one of the first, second or third outputs 109–111 will have an output signal at any one time. On the fourth output 112 an error signal is carried if it is outside of normal ranges.

A fifth output 140 of the memory 108 gives an output signal which characterizes the deviation of the actual angle of articulation, beta p, related to the angle of wheel steering, alpha. The output signal is proportional to the extent of such deviation.

Figure 7:
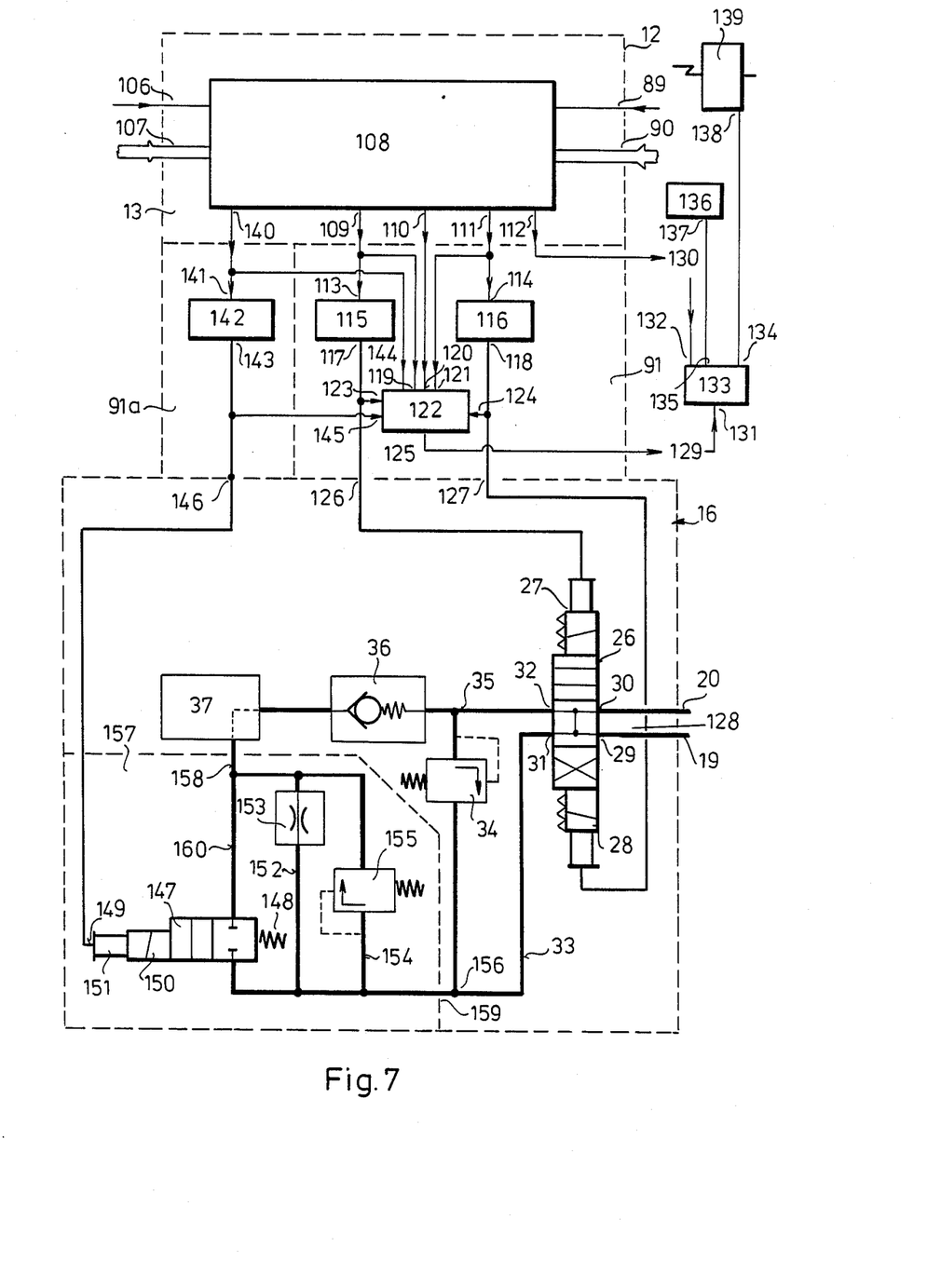
FIG. 7 is a simplified block schematic diagram of the electronic/hydraulic system incorporated in the invention.

FIG. 7 shows in detail the layout of the electronic and electrical units connected to the outputs 109, 110, 111 and 140, as well as the elements forming the hydraulic loop 33 with an hydraulic resistance unit 157. The first output 109 of the programmed memory 108 is connected to the input 113 of a power amplifier 115, while the third output 111 is connected to the input 114 of a power amplifier 116, the outputs 117 and 118 of which are connected to the first and second inputs 126, 127 of the blocking/damping control 16. A circuit for the control of the function of the power amplifiers 115 and 116 is built in.

The inputs 119 of a control circuit 122 is connected to the memory output 109. The second input 120 is connected to the second memory output 110. The third input 121 is connected tot he third memory output 111. The fourth input 124 is connected to the memory output 118. The fifth input 123 is connected to the memory output 117. The fifth output of the programmed memory 108 is connected to the sixth input 144 of control circuit 122. The fifth memory output 140 is connected to the input 141 of the flow resistance control circuit of the resistance control unit 91a, while the output 143 is connected to the seventh input 145 of the control circuit 122. The control circuit 122 has an error signalling output 125.

One task of the control circuit 122 is to cause the signal appearing on its first input 119 to be converted to the signal appearing on the third input 121 only if a signal appears meanwhile on the second input 120. If not, an error signal will be output on 125. The control circuit 122 also determines whether signals appearing on the outputa 117 or 118 correspond to the signals appearing on the memory outputs 109, 111. If not, an error signal appears on the output 125.

Generating and processing of the angle signals are controlled also in the programmed memory 108 according to the program stored therein. The fourth memory output 112 is an error signalling output. The memory output 112 is connected through the first error terminal 130 to input 132 of a switching circuit 133. The error output 125 is connected through a second error signalling terminal 129 to an input 131 of the switching circuit 133. Output 135 of the circuit 133 is connected to the input 137 of a signalling device 136 while a second output 134 is connected to an input 138 of a main power switch 139.

If an error signal appears on the inputs 132 or 131 of the switching circuit 133, both outputs 133, 134 carry an actuating signal for the signalling device 136, and also for the main switch 137, which interrupts the electric supply.

The control circuit 122 also monitors the function of the flow resistance control power amplifier 142. The memory output 140 is connected to the input 144, and similarly to the flow resistance control amplifier 142. It compares the signal arriving at input 145 with the signal at 144. If the two signals do not correspond an error signal appears at output 125, actuating the switching circuit 133 as previously described.

The input 146 of the flow resistance unit 157 of the blocking/damping control 16 is connected to the output 143 of the resistance control amplifier 142. The input 126 of the blocking control 16 is connected to the output 117 of the power amplifier 115, while the input 127 is connected to the output 118 of the power amplifier 116.

A flow resistance unit, generally designated by 157 in FIG. 7, has an hydraulic inlet 159 and outlet 158. It includes an electro-hydraulic shutoff valve 147, having an output line 160 connected to the output 158. The valve 147 has a built-in slide valve 151, which is urged to the closed position (illustrated) by a spring 148 and urged to the open position by an electromagnet 150 connected to terminal 149. The terminal 149 is in turn connected to the input terminal 146. A flow resistor unit 153, of constant cross section, is installed in parallel to the electro-hydraulic valve 147, through an hydraulic line 152. Also in parallel to the electro-hydraulic valve is a pressure regulating valve 155, connected through an hydraulic line 154.

The jackknife controlling apparatus of the invention operates, as follows: The light sensing elements 47, 49, arranged opposite to the light sources 46, 48 of the steering angle sensing unit 10 provide code signals corresponding to the combination of the openings. These signals are received by the line driving circuit 94 via the matching circuit 93.

The unit 10 forwards the steering angle signals appearing in Gray code and characterizing the ordinal number of the illuminated angular section, from the steering gear 9 to the unit 101 lying in the direct vicinity of the control unit 12 through the line 97. The unit 101 forwards the signals to the first input of the control unit 12, while the control signal is forwarded to the input 106 via the lines 104 and 105 respectively.

A similar procedure develops control signals transmitted by lines 89, 90 relative to the articulation angle.

The inputs 107, 90, 89 and 105 form the address lines of the memory 108, which forms the unit evaluating the angular position. The programmed memory 108 evaluates, according to the program stored therein, the signals in Gray code arriving on the input address lines 90 and 107, together with the fourth and fifth input address lines 89, 106 control the code signals.

If the result of comparison indicates that there is no difference between the ordinal numbers, an output signal appears on the output 110. The blocking control 16, in response, does not operate. If, however, the ordinal number of the signals arriving at the inputs 90 and 107 indicate an actual angle of articulation beta which is less than ideal for the angle of steering, a signal will appear on the output 109 forming a signal of deviation with a negative sign. If greater, a signal will appear at the output 111. The output 140 of the programmed memory 108 is formed by one or more data bits. The bit valve of the output 140 represents the difference between the angle of articulation signal on the input 90 and the angle of steering signal on the input 107. The greater the difference the greater the bit value. In case of a system according to FIG. 7, the flow resistance control circuit 142 is formed as a power amplifier, which in case of an input signal appearing on its input 141 will always give the same output signal on the output 143. As a consequence, the electromagnet 150 becomes actuated and moves the electro hydraulic shutoff valve 147 into the open position.

Figure 11:
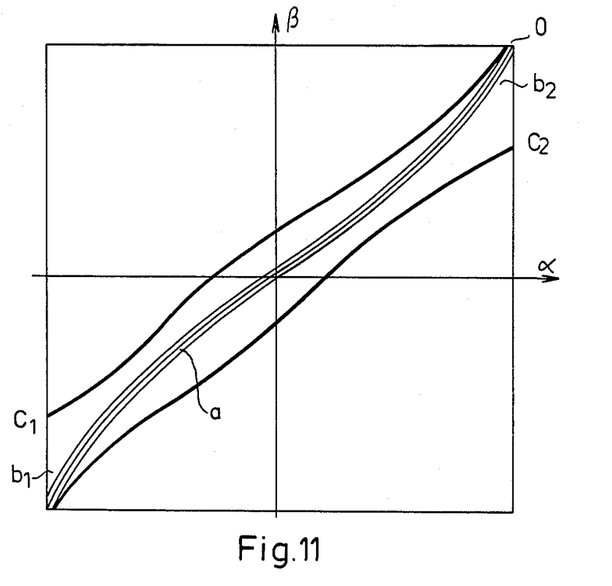
FIG. 11 is a graphic representation of a cruve showing theoretically ideal angles of articulation in relation to angles of steering, and related curves illustrating regions in which increased anti-jackknifing resistance is employed.

With the two stage flow resistance 157 according to FIG. 7, if the deviation between the ideal angle of articulation, beta p, related to the angle of steering, alpha, the actual angle of articulation, beta, does not exceed in any direction the value delimited by curves $c_1$ and $c_2$ in FIG. 11, i.e., that it lies within the zone confined by the curves but outside the zones defined by the curves $b_1$ and $b_2$, a low logic level appears on the output 140, whereby the control circuit 142 does not supply current to the magnet 150 of the electromagnetic shutoff valve 147, so it is kept in its closed state by the spring 148.

If the deviation between the ideal angle of articulation, beta p, related to the angle of steering and the actual angle of articulation, beta, surpasses the value delimited by the curves $c_1$ and $c_2$. Respectively, a high logic level will appear on the output 140. As a consequence, the circuit 142 supplies current to the magnet 150, opening the electromagnetic shutoff valve 147 and connecting the hydraulic input 159 of the flow resistance unit 157 with the hydraulic output 158. In the arrangement in FIG. 7, a signal of deviation with positive sign is carried by output 111 of the programmed memory. This is received by the input 114 of the power amplifier 116 as well as the input 121 of the control circuit 122. The signal on the output 118 of the power amplifier 116 is received by the input 124 of the control circuit 122.

If the signals appearing simultaneously on both inputs 121, 124 are not identical, an error signal appears on the output 125, which actuates the signalling device 136 through the switching circuit 133 and simultaneously releases the main switch 137.

In case of faultless operation, the blocking/damping unit 16 receives the high current executing signal from the output 118 and shifts the three "position" four-way selector valve 26 into the positive position through the electromagnet 28. In this valve position occurence of blocking is indicated by the signal arriving at the third input 128 of the control unit 12. With the embodiment illustrated in FIG. 7 the third input 128 is formed by the ports 29, 30 of the four-way selector valve 26.

Assuming that, when viewed from above, the trailer 3 is turning counter-clockwise, i.e. in a "negative" direction around the articulation connecting the vehicle members, hydraulic liquid flows from the working space 25 of the hydraulic actuator through the line 19 to the first port 29. From there, as the four-way selector valve 26 is in its positive shifted position, it flows to the port 32. Simultaneously the liquid closes the check valve in this direction. Accordingly, the apparatus performs blocking against jackknifing in the "negative" direction. Provided the deviation from the "ideal" angle of articulation falls outside the curves $c_1$, $c_2$, no blocking is performed against jackknifing in a "positive" direction, as with a jackknifing in the positive direction hydraulic liquid flows from the first working space 24 through the line 20 to the port 30 and therefrom to the port 31. The fluid then flows through the hydraulic loop 33.

Assuming at this stage that the actual angle of articulation exceeds the ideal by an amount which places it outside the curves $c_1$, $c_2$, previously programmed into the memory 108, the solenoid valve 147 will have been actuated to an open position, permitting fluid to flow through the line 160 and in the free direction through the check valve 36. There will also be at least some flow of fluid through the parallel line 152 and resistor 153. In this configuration, there will be only a slight resistance to jackknifing, which would be proportional to the angular rate thereof.

In the event that the trailer returns somewhat from the "negative" direction, and the value of the difference between the ideal and actual angles of articulation returns to a value falling within the curves $c_1$, $c_2$, the output at terminal 140 of the programmed memory 108 changes back to a low logic level, and the solenoid valve 147 is deenergized and returns to its closed position. Thereafter, with continued articulation of the trailer in the "positive" direction, hydraulic fluid is caused to flow exclusively through the line 152 and flow resistor 153, exerting a significant damping moment against continued articulation of the trailer, with a force proportional to the angular rate of articulating movement. The system continues to block articulation in a "negative" direction, by reason of the orientation of the check valve 36.

Assuming that articulation of the trailer continues the "positive" direction, it eventually reaches the "ideal" angle of articulation in relation to the angle of steering, as determined by the programmed memory 108, according to the curves of FIG. 11. At this stage, no signals are present at memory terminals 109, 111, and the four-way slide valve 26 returns to its neutral position, illustrated in FIG. 7. A control signal then appears at terminal 110, to indicate to the controller 122 the neutral condition of the system.

If the articulation continues in a "positive" direction, beyond the ideal angle of articulation indicated by the steering angle, a control signal is present at memory terminal 109, resulting in actuation of the four-way valve to connect the ports 29 and 31 together and to connect ports 30 and 32 together. As soon as this occurs, fluid flow is blocked in one direction by the check valve 36, to block further articulation in the "positive" direction. Articulation in the opposite direction, back toward neutral, is enabled, but is damped by reason of the closed condition of the solenoid valve 147, causing fluid to be diverted through the line 152 and flow resistor 153. If, notwithstanding the blocking action, there is further articulation in the "positive" direction, to a point where the deviation between the actual and ideal angles of articulation for the steering angle falls outside the curves C1, C2, the valve 147 becomes actuated, opening the flow line 160 and permitting relatively unrestricted articulation in the direction toward the ideal angle, while continuing to block articulation in the opposite direction.

In a modified version of the invention, a flow resistance unit 257, with a greater degree of variability than the unit 157 of FIG. 7, is substituted therefor. In the flow resistance unit of FIG. 8, primary hydraulic inlet and outlet lines 258, 259 are connected to a parellel grid of control devices, including a plurality of fixed orifice flow resistors 254b, 169, 173 and 175. These resistors devices are disposed in lines 254a, 168, 171 and 174 respectively. In each of the lines 168, 171 and 174, there is a solenoid valve 170, 172 and 176 actuatable as a function of the signal at terminal 140 of the programmed memory device 108. A pressure regulating valve 255 is connected in parallel with the throttle 254b.

Figure 8:
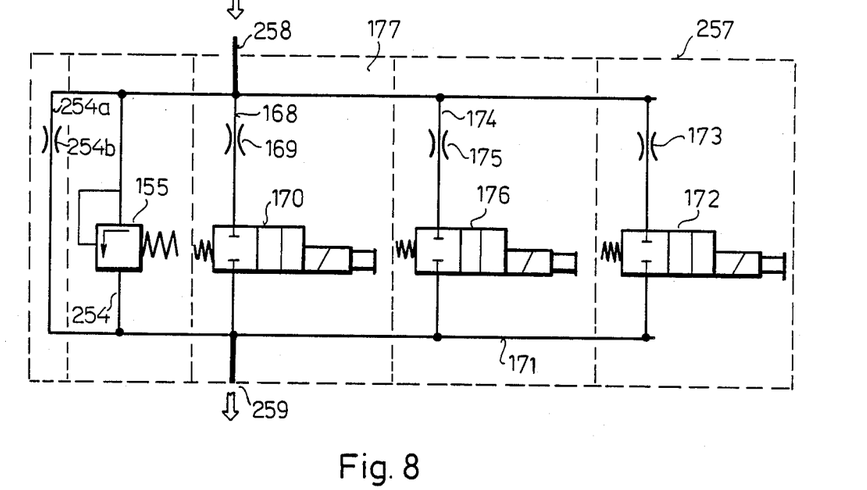
FIG. 8 is an illustration of a modified form of flow resistance control useable in the system of the invention.

In the modification of FIG. 8, the output 140 of the programmed memory device 108 is arranged for a three-bit output, providing for eight combinations of operating conditions of the flow resistance unit 257, depending upon combinations of actuation and deactuation of the several solenoid valves. This arrangement can provide for gradually changing resistance to articulation, as will be understood, with eight stages of resistance being enabled with a three-bit output at the terminal 140.

Figure 9:
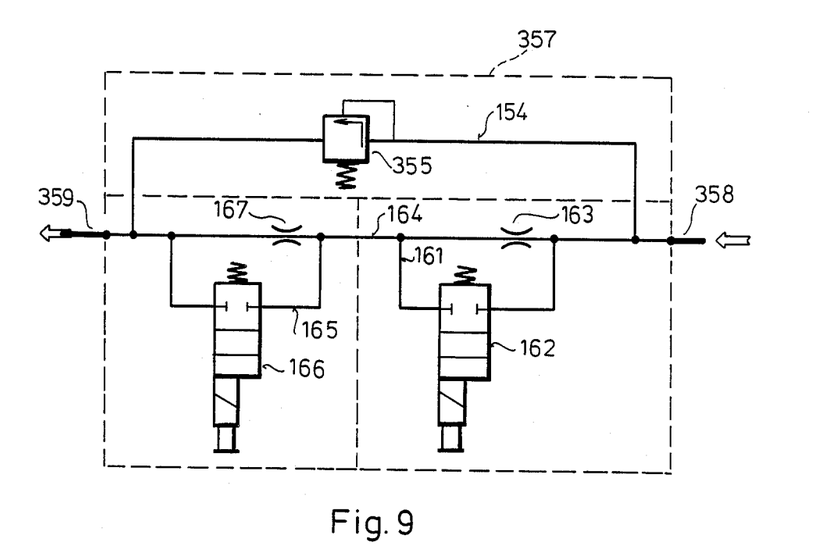
FIGS. 9 and 10 are schematic illustrations of further modifications of the invention.

In the modification of FIG. 9, a flow resistance unit 357, substitutable for the unit 157 in FIG. 7, provides four stages of adjustable resistance, useable with a two-bit output at terminal 140 of the programmed memory device. In the arrangement of FIG. 9, 358 and 359 represent the hydraulic input and output lines. The flow resistance unit includes two fixed orifice throttles 163, 167, joined by a connecting line 164. A bypass line 161 and solenoid valve 162 are connected in parallel with the flow resistor 163, while a bypass line 165 and solenoid valve 166 are connected in parallel with the resistor 167. A pressure regulating valve 355 bypasses both of the resistor units. Depending upon the two-bit output at the terminal 140, the solenoid valves 162, 166 may be selectively actuated or deactuated in four combinations, to provide for changeable resistance.

Figure 10:
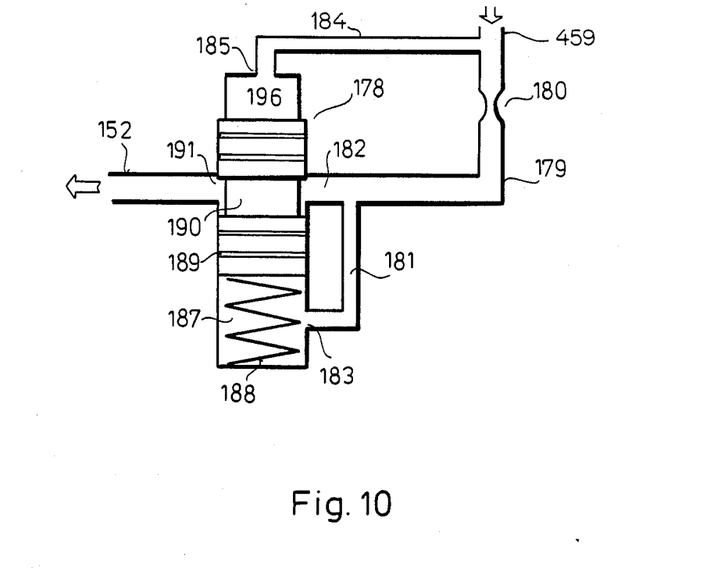

A fourth version of flow resistance unit, which can be substituted for the unit 157 of the embodiment of FIGS. 1-7, is shown in FIGS. 10. The flow resistor element 178 is formed as a two-way flow valve. In the valve body 189 a slide valve 190 is arranged, the frontal surfaces of which form walls of chambers 196 and 187, respectively. Opening 185 of the chamber 196 is connected to the hydraulic input 459 via the line 184. A line 179, provided with a flow restriction 180, is also connected to the input and communicates with the inflow opening 182 of the valve body 189. A line 181 interconnects the line 179 with the inlet 183 to the chamber 187. In the chamber 187 there is the prestressed spring 188, which bears against the frontal surface of the slide valve 190.

In a rest condition, when no flow occurs, the slide valve 190 connects the inflow opening 182 to the outlet opening 191, which again communicates with the hydraulic output 458.

With increasing flow, resistance of the resistor 180 also increases. As a consequence, differential pressure between the chambers 196 and 187 also increases, tending to move the slide valve 190 against the spring 188. After a certain determined level of flow, the force arising from the differential pressure and applied onto the slide valve 190 exceeds and overcomes the prestress force of the spring 188, whereby the slide valve becomes displaced and reduces the effective cross section of the valve openings 182 and 191, respectively.

FIG. 11 shows the control characteristic of the embodiment according to FIG. 1-7. The central curve "a" enclosed by the curves $b_1$, $b_2$, indicates the coordination of the "ideal" angles of articulation, beta, related to the angle of, alpha, of the steered wheels. When the differential falls within the narrow zone defined by the curves $b_1$, $b_2$, any blocking actuation is cleared. The total operational range of the zone between $b_1$, $b_2$, lies between values $\pm 0.5°$ and $\pm 1°$ of the ideal angle of articulation.

Insofar as the actual angle of articulation, beta, falls outside the zone defined by the curves $b_1$, $b_2$, and the direction of change of the angle of articulation is in direction of increasing deviation, the blocking/damping circuit is in a blocking condition. However, within the zone defined by the curves $b_1$, $c_1$ or $b_2$ or $c_2$, $c_2$, while the angle of articulation is changing in an opposite "correct" direction, the apparatus exerts a damping (as distinguished from blocking) resistance, defined by the flow resistance unit, against the change of the angle of articulation.

The width of the zone enclosed by the curves $c_l$ and $c_2$ changes as a function of the steering angle. Also, the edge of the zone, within the whole operative range of steering angles, lies within a distance from the curve "a", which represents a difference with respect to the ideal angle of articulation falling in the range of between 0° to 20°.

In the range of small angles of the steered wheel and angle of articulation, respectively (e.g., about $\pm 8°$), the functional zone width of damping is approximately symmetrical. In this range the primary task of damping is to prevent serpentine swinging of the trailer 3 at a high speed of travel of the articulated bus 1.

With larger angles of the steered wheel the zone $c_1$, $c_2$ is arranged asymmetrically around the curve "a" and in such a manner that the part directed to the smaller angles of articulation is wider. At the extreme angle of the steered wheel the zone width is about 15°-20°. These levels of angles of the steered wheels and angles of articulation occur with the low speed of travel of the articulated vehicle. Accordingly, serpentine swingings of the trailer 3 are generally non-existant and need not be hindered.

In some cases, the system of the invention may be provided with means (not shown) for sensing vehicle velocity. In such cases, when the angle of actual articulation deviates sufficiently from the ideal angle to cause blocking action to be initiated, such action may also cause, in selected speed ranges, a command for reduction of the velocity of the driving motor for the vehicle.

Likewise, sensing means may be provided for sensing the angular velocity of jackknifing and/or angular acceleration. Upon either or both of these exceeding predetermined values, an ouput signal, modifying the throttling value of the throttling resistance, can be initiated.

Figure 12:
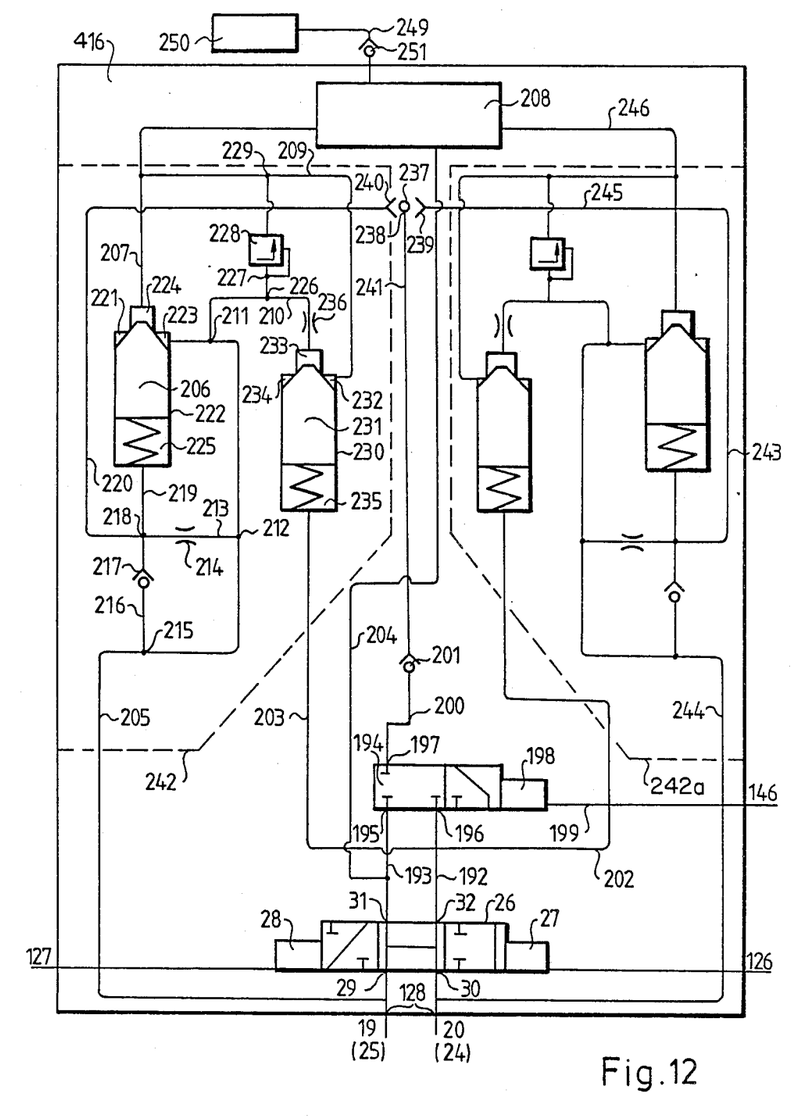
FIG. 12 is a schematic illustration of a still further embodiment of the invention.

In FIG. 12, a further embodiment of hydraulic valve system and electro-hydraulic throttle unit is shown, in which the first and second working spaces 25, 24 of the hydraulic actuator 21 are connected to a hydraulic tank through lines with a high liquid flow capacity and hydraulically controlled valves, the control slides of the valves being connected to the three-position four-way selector valve 26.

With this embodiment, the input 128 of the blocking unit 416 is formed by the line 19 connected to the first working space 25 and by the line 20 connected to the second working space 24. Line 19 is connected to the first port 29 of the valve 26, while line 20 is connected to the second port 30 thereof. Actuating electromagnet 27 of the valve 26 is connected to the input 126 of the blocking unit 416, while the electromagnet 28 is connected to the input 127. Activation of the electromagnet 28 establishes communication between the ports 29 and 32 of the selector valve 26, while the electromagnet 27 establishes communication between the ports 30 and 32. Actuating electromagnet 198 of a two-way valve 194 is connected via line 199 to the fourth input 146 of the blocking unit 416. In the connected state of the actuating electromagnet 198, port 197 is connected to port 196, while in the disconnected state the port 197 does not communicate.

The first port 29 of the selector valve 26 is connected through the line 205 with an hydraulically controlled valve 206, which in turn communicates with hydraulic tank 208 via line 207. Moving element 222 of the valve 206 is shaped with a conical closing pat 223 which, in a closed state of the valve, closes the annular space 221 communicating with the line 205 from the connected space 224 communicating with the line 207. The frontal face of the moving element 222, lying opposite to the conical closing part 223, forms a wall of the control space 225, which is connected through the line 219 and the check valve 217 contained therein with the line 205. Lines 219 and 216 are interconnected at the connection 218. Lines 213 and 220 are connected also thereto. Line 213 is connected to the line 205 at the connecting place 212. A flow resistor 214 is arranged in the line 205.

In the line 216, the check valve 217 is built-in in such a manner, that it closes in the direction of the connection 218 and the control space 225. Connection 218 is connected by means of the line 220 with the first input 240 of an hydraulic "OR" valve 237, while the output 237 of the OR valve is connected to the check valve 201 via the line 241.

In the line 205, between the connecting point 212 and the connection to the annular space 221 there is a further connecting point 211, into which the line 210, provided with flow resistor 236, discharges. Line 210 interconnects the connecting point 211 with the connecting space 233 of an hydraulically controlled valve 230. The moving element 231 of the hydraulically controlled valve 230 is formed with the conical closing part 234 which, in a closed state of the valve, separates the annular space 232 communicating with the line 209 from the connecting space 233 communicating with the line 210. The frontal surface of the moving element 231, lying opposite to the conical closing part, forms the wall of a control space 235 which communicates with the line 192 through the line 203, and therethrough with the third port 32 and second port 196, respectively.

In the section of the line 210, between the connecting point 211 and the throttle 236 the connecting point 226 is established, which is connected to the line 209 at the connection 229 through the line 227 incorporating a pressure regulating valve 228.

The hydraulic circuit consisting of the valves 206 and 230 can be considered as a hydraulic valve unit 242, the connection of which is formed by the lines 205, 220, 207 and 203.

An identically constructed hydraulic valve unit 242a is connected to the line 20, communicating with the second working space 24 of the hydraulic actuator 21, through the line 244, to the third port to the line 192 and the port 32 through the line 202, to the second input 239 of the hydraulic OR valve 237 through the lines 243, 245, as well as to the hydraulic tank 208 by the line 246.

The line 204 connected to the line 193 interconnecting the ports 31 and 195, discharges into the hydraulic tank 208. The task of the line 204 is to lead off clearance leakage of the liquid.

The hydraulic tank 208 is closed and stays under a constant prestressing pressure, ensured by the pressure unit 250 connected thereto via the line 249. In the line 249 there is a check valve 251, which closed against the stream from the tank 208 in direction of the pressure unit 250.

The embodiment according to FIG. 12 operates, as follows: In any combined connection of the three-position four-way selector 26 and the two-way valve 194 the hydraulic valve unit 242 allows flow from the pressurized hydraulic tank 208 towards the first port 29 through the lines 205 and 207. A reduced pressure in the first working space 25 of the working cylinder 21, occuring during the jackknifing of the trailer 3 in a clockwise ("positive") direction, spreads through the line 19, to the first port 29, through the line 205, and through the check valve 217, allowing a flow in this direction to the control space 225, as a consequence, the pressurized liquid coming from the hydraulic tank 208, through the line 207 to the connecting space 224, displaces open the moving element 222 of the valve 206, so the flow is allowed to stream through the annular space 221, the line 205 and the first port 29 to the line 19, and so to the first working space of the cylinder 21. Similarly, the hydraulic valve unit 242a always allows the flow from the pressurized tank 208 through the lines 246 and 244 towards the port 30.

The control unit 416 effects blocking or throttling in such a manner that it prevents or reduces the flow from the working spaces 24, 25 to the hydraulic tank 208. When the electromagnet 28 of the three-position four-way selector valve 26 is actuated, the blocking unit 416 closes against a counter-clockwise jackknifing. In this position the pressure of the liquid in the line 205 corresponds to the pressure of the liquid in the control spaces 225, 235, so the liquid of the same pressure in the annular space 221 and in the connecting space 233, since it affects smaller surfaces is unable to open the moving element 230, so the hydraulic valve unit is kept in its closed state.

Now, when the electromagnet 27 of the selector valve 26 is actuated, the blocking unit 416 closes to a clockwise jackknifing, while the hydraulic valve unit 242a operates in the same manner as the hydraulic valve unit 242, as specified above. When the electromagnetic 27 is actuated, jackknifing in the counter-clockwise direction is allowed. Liquid flows from the line 19, connected to the first working space 25, through the port 29 into the line 205. Meanwhile in the line 20, at the second port 30 relative pressure reduction exists. In this position the selector valve 26 communicates the reduced pressure through the third port 32 and lines 192 and 203 to the control sapce 235. The liquid arriving through the lines 205 and 210, and the throttle 236, is able to open the displaceable element 230 against prevailing low pressure. Accordingly, it can flow through the annular space 232, the lines 209 and 207 to the hydraulic tank 208.

If the two-way valve 194 is in its closed position, pressure in the control space 225 of the valve 206 corresponds to the pressure prevailing in the annular space 221. Accordingly, the displaceable element 206 maintains its closed state. When the electromagnet 198 of the two-way valve 194 is actuated, line 200 is communicating with the line 192, in which there is a depression. The check valve 201, the hydraulic OR valve 237 allow to flow the liquid thorugh lines 200, 241, 220, 219 from the control space 225 of the valve 206. The liquid coming from the ine 205 to the annular space 223 is lifting the displaceable element 222, whereby the valve 206 enables unhindered flow, bypassing the throttle 236, through the line 207 into the hydraulic tank 208.

In case of a deviation with positive sign, i.e. when the electromagnet 28 of the valve 26 is actuated, jackknifing in a positive direction is similarly allowed.

The blocking unit 416 together with the hydraulic actuator 21 form the unit 18 for sensing the change of direction of the angle of articulation, as its valves are opening or closing in accordance with the direction of jackknifing of the trailer 3. An open position of the displaceable element 231 of the valve 230 indicates a negative direction of jackknifing at a deviation with a negative sign. The closed position of the displaceable element 231 indicates jackknifing in a positive direction at a devication with negative sign. With a deviation with negative sign displaceable element 231 of the valve 230 of the hydraulic valve unit 242 indicates the direction of jackknifing. With a deviation of a positive sign the hydraulic valve unit 242a, constructed similarly as the unit 242, indicates the prevailing direction of jackknifing.

We claim:

1. In an articulated motor vehicle apparatus of the type having a pair of vehicle units hingedly connected to each other and an anti-jackknifing means connected between said vehicle units for controlling the angle of articulation therebetween, said anti-jackknifing means including hydraulic cylinder means connecting said units and being extendable and retractable in accordance with articulations of said vehicle units, and respective sensor means for measuring the angle of steering of said motor vehicle and the angle of articulation of said vehicle units, the improvement which comprises (a) a preprogrammed controller device, programmed with a predetermined desired angles of articulation for different angles of steering, (b) a multiple position hydraulic valve means operated by said controller device and connected to opposite effective ends of said hydraulic cylinder means, (c) said valve means having a first functional position in which hydraulic fluid flows in the absence of substantial resistance from one effective end to the other of said hydraulic cylinder means, in either direction, (d) a hydraulic flow control loop selectively connected through said valve means to the opposite effective ends of said hydraulic cylinder means, (e) said flow control loop including a check valve for substantially preventing flow of fluid in one direction and at least one flow resistance device for resisting fluid flow through said loop in the opposite direction, (f) means actuated by said preprogrammed controller device for controllably changing the effectiveness of said resistance device, (g) first and second inputs to said controller device comprising said respective steering and articulation sensor means, (h) said controller device being operative to compare the respective angles of steering and articulation with a preprogrammed relationship of steering and articulation angles and for outputting a first signal indicating the existence of an angle of deviation of actual articulation angle from a desired articulation angle for the steering angle and the direction of such angle of deviation, and a second signal representative of the magnitude of such angle of deviation, (i) said controller device being operative, in response to the existence of no significant angle of deviation from preprogrammed desired articulation angle, to cause said valve means to be set to said first functional position, (j) said controller device being further operative, in response to the existence of predetermined minimum angle of deviation from desired articulation, to shift said valve means alternatively to a second or third functional position in which fluid flow from said hydraulic cylinder means, in a direction representing greater deviation in the direction of existing deviation, is blocked by said check valve and flow representing articulation in a direction returning toward desired deviation is controllably resisted by said resistance device, (k) said preprogrammed controller device being operative to change the effectiveness of said resistance device as a function of the magnitude of the angle of deviation.

2. An articulated motor vehicle apparatus according to claim 1, further characterized by (a) said controller device comprising at least one control valve means, (b) said valve means being selectively operable to increase the effectiveness of said resistance device as said angle of deviation becomes smaller.

3. An articulated motor vehicle apparatus according to claim 2, further characterized by (a) said hydraulic loop including a fluid by-pass line connected in by-passing relation to said resistance device, (b) a by-pass valve, actuated by said controller device, for opening said by-pass line to enable flow of fluid around said resistance device and thereby change the effectiveness thereof.

4. An articulated motor vehicle apparatus according to claim 1, further characterized by (a) said preprogrammed controller device, including
 (1) preprogrammed data providing desired angles of articulation for different angles of steering, and
 (2) preprogrammed data representing a predetermined range of angles of deviation from desired articulation for different angles of steering, (b) said controller device changing the effectiveness of said resistance device as a function of the relationship of an angle of deviation to said range of angles of deviation, whereby said resistance is rendered less effective when said angle of deviation is greater than a preprogrammed range of angles for the particular angle of steering.

5. An articulated motor vehicle apparatus according to claim 4, further characterized by (a) the preprogrammed range of angles of deviation for large angles of steering being asymmetrically larger in the direction of a smaller angle of articulation between vehicle units.

* * * * *